June 13, 1967  A. GIACOMETTI  3,325,240
APPARATUS FOR OBTAINING OPTICAL PROJECTIONS OR PHOTOGRAPHIC
REPRODUCTIONS WITH A STEREOSCOPIC EFFECT
Filed Oct. 5, 1964
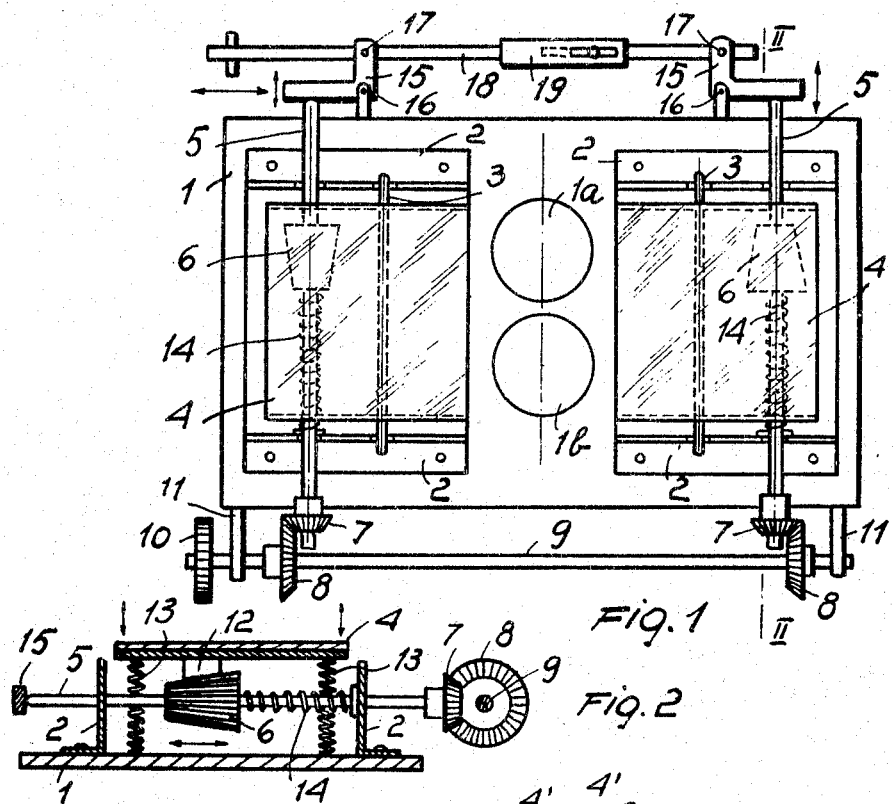
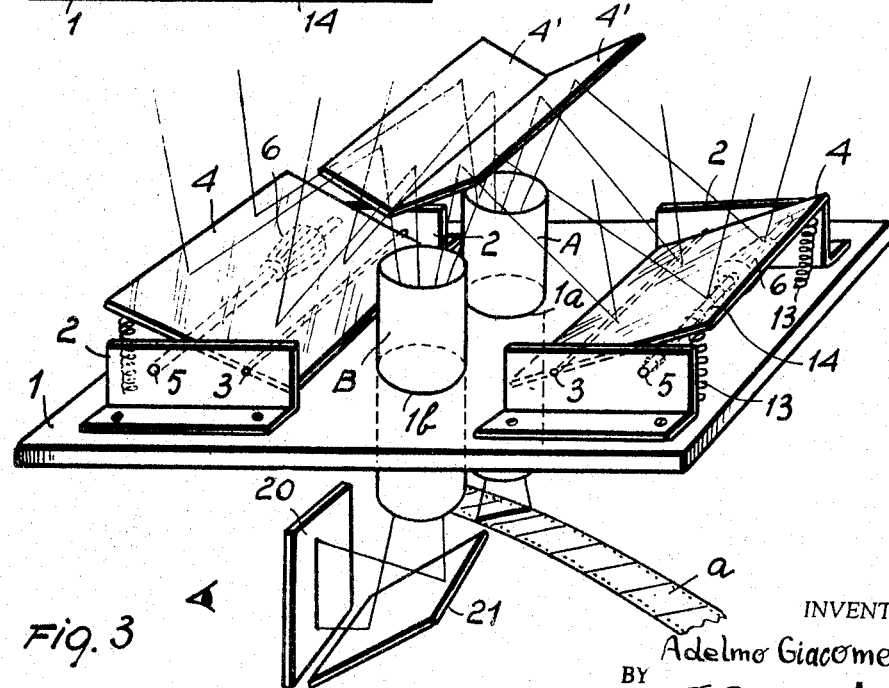
INVENTOR.
Adelmo Giacometti
BY
Agent

United States Patent Office 3,325,240
Patented June 13, 1967

3,325,240
APPARATUS FOR OBTAINING OPTICAL PROJECTIONS OR PHOTOGRAPHIC REPRODUCTIONS WITH A STEREOSCOPIC EFFECT
Adelmo Giacometti, Corso XXII Marzo 22, Milan, Italy
Filed Oct. 5, 1964, Ser. No. 401,505
4 Claims. (Cl. 352—60)

This invention relates to an improvement in apparatuses for exposure or projection of cinematographic films, adapted to provide upon the projection a stereoscopic effect.

This application is a continuation-in-part application of my copending application Ser. No. 204,665 filed June 20, 1962, now U.S. Patent No. 3,160,889.

In this copending application an apparatus for obtaining photographic reproductions with a stereoscopical effect has been described, comprising at least two coaxial lenses, at least two first reflecting means offset with respect to the axis of the lenses, at least two second reflecting means, in front of said two lenses, said first reflecting means receiving the rays from the subject to be reproduced and reflecting them towards said second reflecting means, said second reflecting means receiving said rays reflected from the first reflecting means and reflecting them towards said lenses, a photosensitive film receiving said rays after their passage through said lenses, frame members for supporting said coaxial lenses, and said first and said second reflecting means, said first reflecting means having hinge means for hingedly connecting said first reflecting surface on one of said frame members, a plane surface rigid with said first reflecting means, a shaft offset with respect to said hinge means and journalled on one of said frame members, said shaft extending parallel to said plane surface, a faceted surface on said shaft in contact with said plane surface, spring means for pressing said faceted surface against said plane surface and transmission means for transmitting a rotatory motion to said shaft.

It is the object of this invention to ensure the tilting adjustment of said reflecting and/or refracting means, whilst still maintaining at the same time the vibratory swinging motion of said means.

It is another object of this invention to provide suitable means for regulating the sharpness of images upon varying the distance with respect to the apparatus of the subject.

These and still other objects are attained by the improved apparatus according to this invention, which comprises, besides the lens for the projection or the photographic reproduction, also a lens arranged side-by-side to the former for checking the image sharpness depending upon the inclination of the reflecting and/or refracting means, and in order to obtain the inclination of said reflecting and/or refracting means as required by the displacements of the subjects, it further comprises rotary rollers having substantially a frustoconical shape with polygonal contour in engagement with said means through inclined plane members, regulating means being further provided to axially displace said rotary rollers relative to said inclined plane members.

Further characteristic features and advantages of the invention will become more apparent from the following detailed description of a preferred non-limiting embodiment of an apparatus improved according to this invention taken in conjunction with the accompanying drawing, in which:

FIG. 1 is a diagrammatical plan view of the apparatus portion comprising the reflecting and/or refracting device;

FIG. 2 is a cross-section in reduced scale, taken along the line II—II of FIG. 1, FIG. 3 is a diagrammatical perspective view of the apparatus, with certain parts omitted for the sake of clearness.

Referring now to the above figures, the apparatus comprises a base 1 having in its center portion two holes 1a and 1b, adapted to ensure the passage of the rays getting through the two side-by-side lenses A and B. Such lenses A and B serve one for the shooting or cinematographic reproduction and the other one for checking the image sharpness as will be better explained below.

On the base 1 there are mounted the supports 2 supporting the pins 3 extending approximately perpendicular to the optical axis of the apparatus, said pins 3 supporting rotatably the flat mirrors or first reflecting means 4 placed between the supports 2.

Parallel to the pins 3 are small shafts 5 disposed at a distance from the lenses 1a, 1b greater than the distance of the pins 3 therefrom, said shafts being journalled in the supports 2.

Rollers 6 having substantially a frustoconical shape and with regular polygonal contour are keyed on each shaft 5. On the same shafts 5 are also keyed the bevel gears 7 engaging with the corresponding bevel gears 8 which are, in turn, keyed on the drive shaft 9. The latter receives a rotatory motion from any conventional motor through a gear 10 and is sustained by the supports 11 fast with the base 1.

As it is clearly illustrated in FIG. 2, each roller 6 engages with a generatrix thereof against an inclined sliding surface member 12, fastened on the lower part to the respective flat mirror or first reflecting means 4 and the contact of said block member 12 with the roller 6 is ensured by the springs 13 having one of their end portions fastened to the frame of the mirror 4 and the other end portion fastened to the base 1. The shafts 5 are mounted sliding in axial direction in contrast to the action of springs 14, disposed between the rollers 6 and the supports 2, whilst said rollers 6 are keyed with the convergency thereof directed in opposite sense on the respective shafts 5. By such arrangement the axial displacement of the shafts 5 causes analogous movement of the rollers 6 in contrast to the action of springs 14 (in one embodiment gears 7 are slidably connected with the shafts 5 via groove and tongue means, adapted to allow the axial sliding of said shafts, while in another embodiment the shafts 5 are provided with a variable length according to a telescopic system).

For displacing or adjusting the position of the shafts 5 there is provided a control system, comprising the square levers 15 pivoted in 16 on lugs fast with the base 1 and having an arm engaged in a tapped-like manner with the ends of the shafts 5, the other arm being hinged in 17 on a control rod 18. The latter is adjustable in length by means of an adjusting joint 19. The operation of the device is as follows:

The rotation of shafts 5 delivered through the bevel gears 7 and 8, causes a vibratory oscillation of the mirrors 4 around the pins 3 of the same kind as described in my above said parent Patent No. 3,160,889. In fact, the polygonal rollers 6 cause a reciprocating displacement or skipping of the inclined plane members 12 held in contact with the rollers by means of the springs 13.

As described in my above said parent patent, the vibration frequency of the mirrors is selected so that the human eye does not perceive such vibrations but is only influenced by the resulting image.

The mean inclination of the mirrors 4 may be varied by actuating the control rod 18. By displacing for example to the left said control rod 18 (FIG. 1) the left roller 6 is moved towards to the shaft 9 while the right roller 6 is moved apart from the same shaft 9. In fact the engagement between member 12 and roller 6 equals a sliding engagement between two contacting inclined planes, as best seen in FIG. 2, where the arrow shows the adjusting displacement of the shaft 5. Consequently, there occurs a simultaneous symmetrical rotation in opposite sense of mirrors 4 around the respective pins 3. Displacing the control rod 18 to the right causes an opposite rotation of the mirrors. As it may be observed, the inclination of the mirrors 4 may be varied at wish in a very easy manner, ensuring at the same time the engagement of the members 12 with the rollers 6 for imparting a vibratory motion to the mirrors 4, however inclined they may be.

For the visual checking of the inclination of mirrors 4 there is provided a lens B arranged side-by-side to the lens for shooting or reproduction (lens A, FIG. 3); both lens receive optic rays coming from the subject after being reflected by the mirrors or second reflecting means 4 and other flat mirrors 4', suitably inclined, fastened near the lens themselves.

With the lens A and lens B there are intended combinations of two or more lenses respectively adapted to form an image of the subject in a per se known manner. The lenses A and B may thus be called lens devices respectively.

Whilst in a manner similar to what described in my above said parent patent the lens A in the shooting stage causes the formation of an image on the film $a$ or on any other optical storage or receiving means, the lens B delivers a perfectly equal image on a frosted or ground glass 20 or any other optical receiving means subsequent to suitable reflection operated by means of a flat mirror 21.

The image which is formed on the ground glass 20 (like that exposing the film $a$) is the result of an overlapping of two images formed as a consequence of the reflections operated by the pair of mirrors 4 and hence the observer could, under determined conditions, observe a stereoscopic effect, as explained in my above mentioned copending application. In particular, when the inclination of the mirrors 4 will be conveniently adjusted by the above-described device one single image with stereoscopic effect of satisfactory sharpness will be obtained on the ground glass 20.

If the subject moves away or approaches the apparatus, there occurs a change of the useful field of vision of the apparatus with consequent doubling of the image, and to avoid this it is necessary to modify the inclination of the mirrors 4 (by always acting on the device as described above). In fact, for each distance of the subject from the apparatus there is an optimum value of the inclination angle of said mirrors for which value the sharpness and stereoscopic effect are the best.

It is obvious, therefore, that the operator by inclining more or less the mirrors 4 so as to obtain sharp and unique images on the ground glass 20 will easily obtain the correct adjustment of the apparatus for whatever shooting pattern.

The invention is subject, of course, to several changes and modifications, all falling within the scope of the invention. Whatever materials and dimensions could be practically used depending upon requirements, and furthermore all details or members could be replaced with other technically equivalent means.

I claim:

1. An apparatus for obtaining photographic reproductions with a stereoscopic effect, comprising at least one lens device, at least two first reflecting means offset with respect to the axis of the lens device, at least two second reflecting means, in front of said lens device, said first reflecting means receiving the rays from the subject to be reproduced and reflecting them towards said second reflecting means, said second reflecting means receiving said rays reflected from the first reflected means and reflecting them towards said lens device, at least one optical receiving means receiving said rays after their passage through said lens device, frame members for supporting said lens device, and said first and said second reflecting means, said first reflecting means having hinge means for hingedly connecting said first reflecting surface on one of said frame members, a sliding surface rigid with said first reflecting means, a shaft offset with respect to each of said hinge means and journaled on one of said frame members, said shaft extending parallel to said first reflecting means, a faceted surface on said shaft in contact with said sliding surface, spring means for pressing said faceted surface against said sliding surface, transmission means for transmitting a rotatory motion to said shaft and wherein, according to the improvement said sliding surface is inclined in a direction substantially parallel to said shaft, said faceted surface on said shaft has a polygonal contour of substantially frusto-conical shape having an axis thereof parallel to said shaft and one generatrix thereof parallel to said inclined sliding surface in contact therewith, and comprising means for adjusting the relative position between said faceted surface and said inclined sliding surface in a direction parallel to said shaft.

2. An apparatus according to claim 1, comprising two juxtaposed lens devices and wherein said first reflecting means are symmetrically arranged with respect to said lens devices and the conical shapes of each of said faceted surfaces have the convergency thereof directed in opposite directions.

3. An apparatus according to claim 1, comprising two juxtaposed lens devices and two optical receiving means each cooperating with one of said lens devices to receive said rays after their passage through a corresponding of said lens devices.

4. An apparatus according to claim 3, wherein one of said optical receiving means is a frosted glass and the other of said optical receiving means is a photosensitive film.

References Cited

UNITED STATES PATENTS 2,240,398   4/1941   Huitt _____ 352—60

JULIA E. COINER, *Primary Examiner.*